(12) United States Patent
Ohtomo et al.

(10) Patent No.: US 11,421,989 B2
(45) Date of Patent: Aug. 23, 2022

(54) SURVEYING INSTRUMENT

(71) Applicant: TOPCON Corporation, Tokyo-to (JP)

(72) Inventors: Fumio Ohtomo, Saitama (JP); Tetsuji Anai, Tokyo-to (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 214 days.

(21) Appl. No.: 16/896,511

(22) Filed: Jun. 9, 2020

(65) Prior Publication Data

US 2020/0386547 A1 Dec. 10, 2020

(30) Foreign Application Priority Data

Jun. 10, 2019 (JP) .............................. JP2019-107780

(51) Int. Cl.
*G01B 11/26* (2006.01)
*G01C 15/00* (2006.01)
*G01C 15/02* (2006.01)

(52) U.S. Cl.
CPC ........... *G01C 15/006* (2013.01); *G01C 15/02* (2013.01)

(58) Field of Classification Search
None
See application file for complete search history.

(56) References Cited

U.S. PATENT DOCUMENTS

| 2006/0100816 A1 | 5/2006 | Van Toorenburg et al. |
| 2009/0119050 A1* | 5/2009 | Hayashi ................. G01C 11/06 702/94 |
| 2012/0330601 A1* | 12/2012 | Soubra .................... G01S 1/725 702/150 |

(Continued)

FOREIGN PATENT DOCUMENTS

| EP | 2240740 A1 | 10/2010 | |
| EP | 3660451 A1 * | 6/2020 | ............ G01C 15/08 |
| JP | 2016-151422 A | 8/2016 | |
| JP | 2016-151423 A | 8/2016 | |
| JP | 2016-161411 A | 9/2016 | |
| JP | 2017-90244 A | 5/2017 | |

(Continued)

OTHER PUBLICATIONS

European communication dated Oct. 22, 2020 in co-pending European patent application No. 20177929.5.

(Continued)

*Primary Examiner* — Mark Hellner
(74) *Attorney, Agent, or Firm* — Nields, Lemack & Frame, LLC

(57) ABSTRACT

A surveying instrument include a surveying instrument including a surveying instrument main body, a measuring direction image pickup module for acquiring a first image, a distance measuring unit for measuring a distance to the object, a projecting direction detecting module for detecting a projecting direction of the distance measuring light, a time detector for generating a signal of a reference time, a downward image pickup module for acquiring a second image, an attitude detector for detecting a tilt of the surveying instrument main body and an arithmetic control module, wherein the arithmetic control module is configured to detect a change between the first images or the second images, determine a measuring point of the object with respect to the vertical lower image based on the change between the images and the detection results of the distance measuring unit and the projecting direction detecting module and the reference time.

6 Claims, 12 Drawing Sheets

(56) References Cited

U.S. PATENT DOCUMENTS

| | | |
|---|---|---|
| 2014/0309960 A1 | 10/2014 | Vennegeerts et al. |
| 2016/0238385 A1 | 8/2016 | Ohtomo et al. |
| 2016/0238708 A1 | 8/2016 | Ohtomo et al. |
| 2016/0259039 A1 | 9/2016 | Ohtomo et al. |
| 2017/0131404 A1 | 5/2017 | Ohtomo et al. |
| 2017/0168142 A1 | 6/2017 | Kumagai et al. |
| 2017/0227357 A1* | 8/2017 | Ohtomo ................ G01C 5/00 |
| 2020/0166340 A1* | 5/2020 | Hinderling ............ F16M 11/18 |
| 2020/0386546 A1 | 12/2020 | Ohtomo et al. |

FOREIGN PATENT DOCUMENTS

| | | |
|---|---|---|
| JP | 2017-106813 A | 6/2017 |
| WO | 2009/100773 A1 | 8/2009 |

OTHER PUBLICATIONS

European communication dated Nov. 25, 2020 in corresponding European patent application No. 20177932.9.

\* cited by examiner

SURVEYING INSTRUMENT

BACKGROUND OF THE INVENTION

The present invention relates to a surveying instrument which enables the measurement with the simple installation work.

In case of making a survey with the use of a surveying instrument, the surveying instrument must be first installed on a reference point.

In general, in case of installing the surveying instrument on the reference point, the installation of the surveying instrument is carried out using a tripod. However, the surveying instrument must be horizontally leveled up on the tripod, and a machine center of the surveying instrument must be accurately positioned on a vertical line running through the reference point. Further, a height from the reference point to the machine center (an instrument height of the surveying instrument) must be also measured. For this reason, installation work of the surveying instrument is complicated and requires a time and a skill.

Further, in case of scanning (a scan) an object which is to be measured with the use of the distance measuring light, the scan must be carried out in a state where an attitude of the surveying instrument has been stabilized. Therefore, when the surveying instrument is to be installed, it is important to stably fix the surveying instrument by using the tripod.

SUMMARY OF INVENTION

It is an object of the present invention to provide a surveying instrument which enables the measurement even if an attitude is unstable.

To attain the object as a described above, a surveying instrument according to the present invention includes a surveying instrument main body having a reference optical axis, a measuring direction image pickup module which acquires a first image including an object along a first image pickup optical axis having a known relationship with the reference optical axis, a distance measuring unit for irradiating a distance measuring light and measuring a distance to the object, a projecting direction detecting module for detecting a projecting direction of the distance measuring light, a time detector for generating a signal of a reference time, a downward image pickup module which acquires a second image along a second image pickup optical axis extending downward at a predetermined angle with respect to the reference optical axis, an attitude detector for detecting a tilt of the surveying instrument main body, a display unit and an arithmetic control module, wherein the arithmetic control module is configured to control the display unit in such a manner that a vertical lower position is shown on the second image based on a detection result of the attitude detector, acquire the first images and the second images at the predetermined time intervals, detect a change between at least either the first images or the second images, associate the change between the images and the detection results of the distance measuring unit and the projecting direction detecting module with each other based on the reference time, and determine a measuring point of the object with respect to the vertical lower image.

Further, in the surveying instrument according to a preferred embodiment, further comprising an installation reference plate which is installed on a reference point and has a reference marker formed into a known shape, wherein the surveying instrument main body is held in such a manner that the reference marker is included in the second image and the arithmetic control module is configured to control the display unit in such a manner that the determined measuring point determined with reference to the reference point is shown in the first image based on a deviation between the reference point and the vertical lower position in the second image.

Further, in the surveying instrument according to a preferred embodiment, the arithmetic control module is configured to calculate a position of a machine center with respect to the reference point based on a size and a shape of the reference marker in the second image, and measure the object with reference to the reference point based on the position.

Furthermore, in the surveying instrument according to a preferred embodiment, the arithmetic control module is configured to average the detection results of the attitude detector at every predetermined time, and control the display unit which displays at least one of a reference target indicative of the horizontality on the first image and a lower target on the second image based on a calculated average tilt.

According to the present invention, a surveying instrument main body having a reference optical axis, a measuring direction image pickup module which acquires a first image including an object along a first image pickup optical axis having a known relationship with the reference optical axis, a distance measuring unit for irradiating a distance measuring light and measuring a distance to the object, a projecting direction detecting module for detecting a projecting direction of the distance measuring light, a time detector for generating a signal of a reference time, a downward image pickup module which acquires a second image along a second image pickup optical axis extending downward at a predetermined angle with respect to the reference optical axis, an attitude detector for detecting a tilt of the surveying instrument main body, a display unit and an arithmetic control module, wherein the arithmetic control module is configured to control the display unit in such a manner that a vertical lower position is shown on the second image based on a detection result of the attitude detector, acquire the first images and the second images at the predetermined time intervals, detect a change between at least either the first images or the second images, associate the change between the images and the detection results of the distance measuring unit and the projecting direction detecting module with each other based on the reference time, and determine a measuring point of the object with respect to the vertical lower image. As a result, the measurement is enabled even if an attitude of the surveying instrument main body is unstable.

DETAILED DESCRIPTION OF THE PREFERRED EMBODIMENT

A description will be given on an embodiment of the present invention by referring to the attached drawings.

Figure 1:
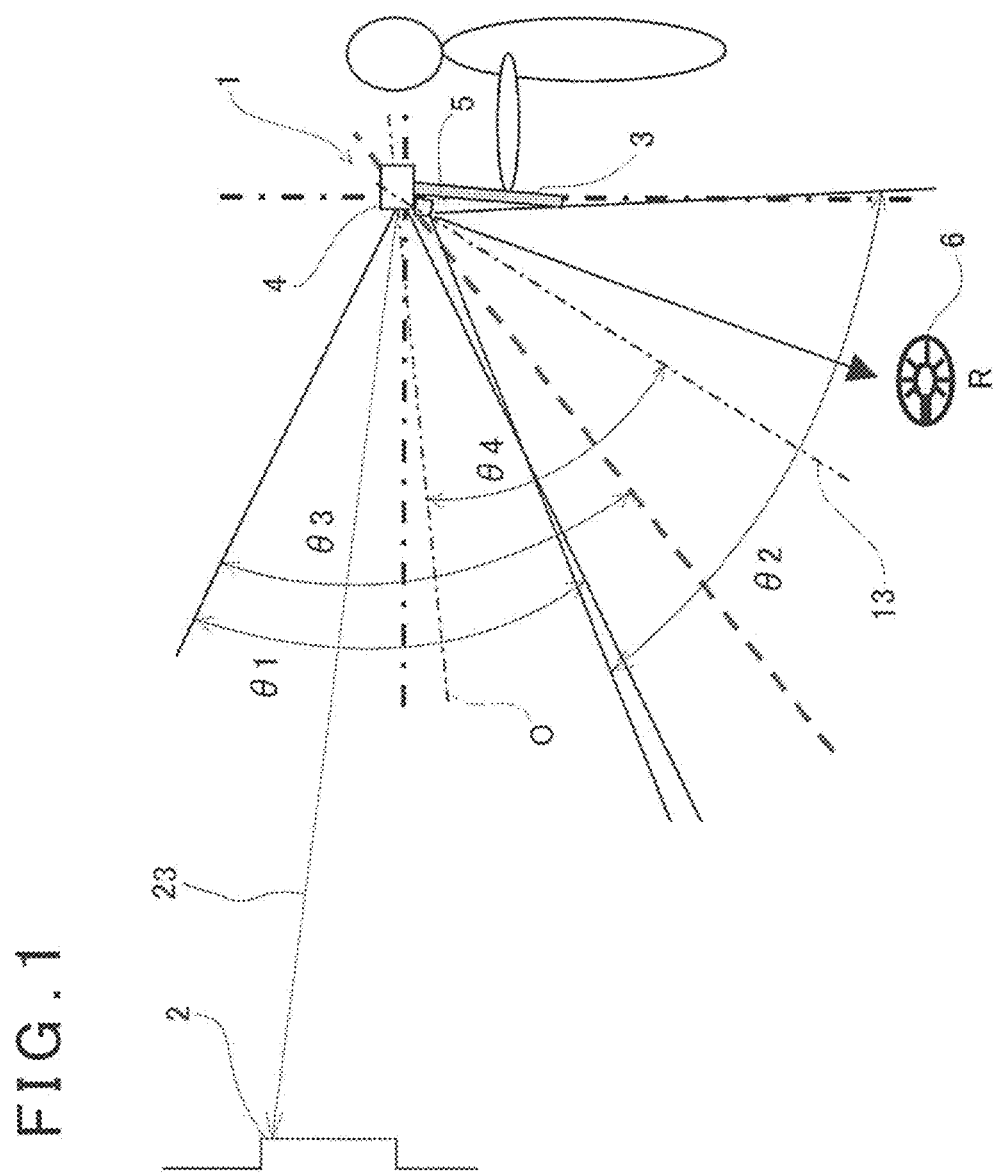
FIG. 1 is a schematical drawing showing an embodiment of the present invention.

FIG. 1 is a drawing to show an outline of the embodiment of the present invention. In FIG. 1, a reference numeral 1 denotes a surveying instrument and a reference numeral 2 denotes an object which is to be measured.

The surveying instrument 1 mainly has a hand pole 3, a surveying instrument main body 4 provided at an upper end of the hand pole 3, a downward image pickup module 5 provided on the surveying instrument main body 4 or the hand pole 3, and an installation reference plate 6 installed on a reference point "R" (a point which becomes a reference for the measurement).

The hand pole 3 is a support member for the surveying instrument main body 4 or the downward image pickup module 5, and it is also an operation handle configured for performing the measurement work. It is to be noted that the hand pole 3 may be formed into an appropriate shape such as a hook-like or ring-like handle without being restricted to a rod shape.

The surveying instrument main body 4 has a measuring direction image pickup module 7 (to be described later) and a distance measuring unit 8 (to be described later). Further, the surveying instrument main body 4 and the downward image pickup module 5 have a known positional relationship.

An optical system of the distance measuring unit 8 has a reference optical axis "O". An optical axis of an optical system of the measuring direction image pickup module 7 (hereinafter a first image pickup optical axis 9) tilts upward at a predetermined angle (6°, for instance) with respect to the reference optical axis "O". Further, a distance and a positional relationship between the optical axis of the measuring direction image pickup module 7 and the optical axis of the distance measuring unit 8 are known. The distance measuring unit 8 and the measuring direction image pickup module 7 are accommodated in a casing of the surveying instrument main body 4.

On a rear surface of the casing (a surface facing a worker), a display unit 11 (see FIG. 2) and an operation module are provided. It is to be noted that the display unit 11 may be formed as a touch panel, and the display unit may also serve as the operation module. In the following description, the display unit 11 is a touch panel, and the display unit 11 also functions as the operation module.

Each of the surveying instrument main body 4 and the downward image pickup module 5 has an image pickup element such as a CCD or CMOS, and each pixel can specify a position the image pickup element. For instance, the measuring direction image pickup module 7 has the pixel coordinates having the first image pickup optical axis 9 as an origin, the downward image pickup module 5 has the pixel coordinates having an optical axis of the downward image pickup module 5 (hereinafter a second image pickup optical axis 13) as an origin, and a position of each pixel on an image pickup element is specified by the pixel coordinates. As the downward image pickup module 5, for instance, a commercially available digital camera may be used. The downward image pickup module 5 is electrically connected to the surveying instrument main body 4 by a required means such as a wireless or wired means. An image signal input from the image pickup element is input to an image processing module 15 (see FIG. 2) via an arithmetic control module 16 (see FIG. 2).

Further, the image acquisition of the downward image pickup module 5 is controlled by the arithmetic control module 16. Further, the synchronization control over the image acquisition performed by the downward image pickup module 5 and the image acquisition performed by the measuring direction image pickup module 7 is carried out by the arithmetic control module 16.

The downward image pickup module 5 is fixed to the casing of the surveying instrument main body 4, and integrated with the surveying instrument main body 4. It is to be noted that the downward image pickup module 5 may be incorporated in the casing. The downward image pickup module 5 (that is, an image forming position of the downward image pickup module 5) is provided at a known position with respect to a machine center of the surveying instrument main body 4. The second image pickup optical axis 13 is directed downward and set at a predetermined known angle with respect to the reference optical axis "O". The second image pickup optical axis 13 and the reference optical axis "O" have a known relationship. It is to be noted that the reference optical axis "O", the first image pickup optical axis 9, and the second image pickup optical axis 13 are set to a predetermined relationship.

A field angle of the measuring direction image pickup module 7 is θ1, and a field angle of the downward image pickup module 5 is θ2. θ1 and θ2 may be equal to or different from each other. Further, the field angle of the measuring direction image pickup module 7 and the field angle of the downward image pickup module 5 do not have to overlap, but it is desired for the field angle of the measuring direction image pickup module 7 and the field angle of the downward image pickup module 5 to overlap by a predetermined amount. Further, the field angle of the downward image pickup module 5 and a direction of the second image pickup optical axis 13 are set in such a manner that the installation reference plate 6 is included in an image.

Figure 2:
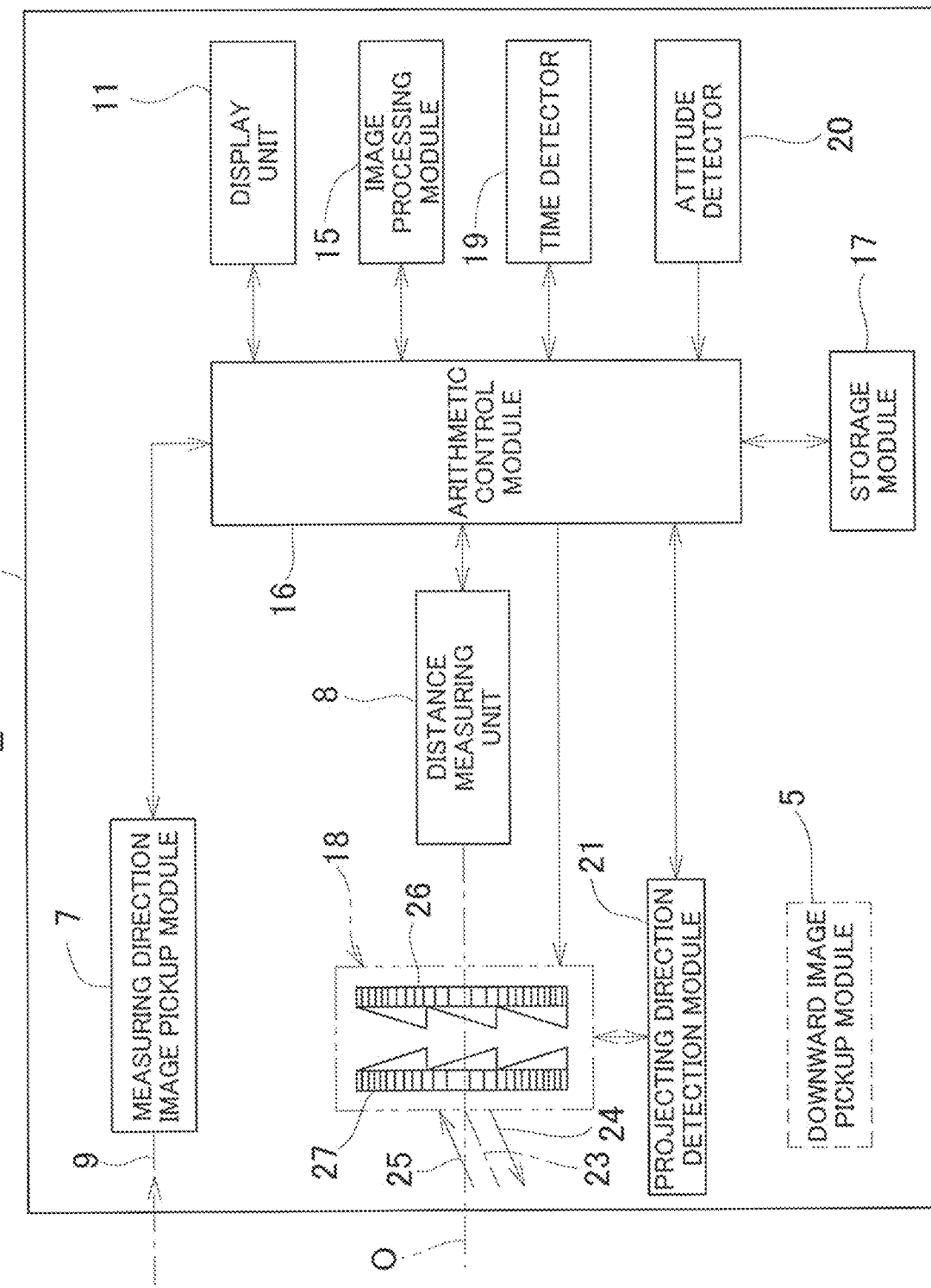
FIG. 2 is a schematical block diagram showing a surveying instrument main body according to the embodiment of the present invention.

A description will be given on an outline configuration of the surveying instrument main body 4 by referring to FIG. 2.

The surveying instrument main body 4 includes the distance measuring unit 8, the arithmetic control module 16, a storage module 17, the image processing module 15, an optical axis deflector 18, a time detector 19, an attitude detector 20, the measuring direction image pickup module 7, a projecting direction detecting module 21, and the display unit 11. They are accommodated and integrated in a casing 22.

The distance measuring unit 8 and the optical axis deflector 18 are arranged on the reference optical axis "O". The distance measuring unit 8 has a distance measuring optical axis 23 running through the center of the optical axis deflector 18. The distance measuring unit 8 emits the distance measuring light 24 as a laser beam onto the distance measuring optical axis 23, receives the reflected distance measuring light 25 which enters from the distance measuring optical axis 23, and performs the measurement of the object 2 based on the reflected distance measuring light 25. It is to be noted that the distance measuring unit 8 functions as an electronic distance meter. Further, the distance measurement data acquired by the distance measuring unit 8 is associated with a reference time (to be described later) and stored in the storage module 17.

The optical axis deflector 18 deflects the distance measuring optical axis 23, and sights the distance measuring light 24 on the object 2. In a state where the optical axis deflector 18 does not deflect the distance measuring optical axis 23, the distance measuring optical axis 23 coincides with the reference optical axis "O". It is to be noted that, as the optical axis deflector 18, the optical axis deflectors disclosed in Japanese Patent Application Publication No. 2017-90244, Japanese Patent Application Publication No. 2016-151422, and Japanese Patent Application Publication No. 2017-106813 can be used.

As the laser beam, any one of the continuous light, the pulsed light or the intermittent modulated distance measuring light (the burst light) disclosed in Japanese Patent Application Publication No. 2016-161411 may be used. It is to be noted that the pulsed light and the intermittent modulated light are generically referred to as the pulsed light.

In the storage module 17, various types of programs are stored. These programs include: an image pickup control program, a display program, a tilt calculation program for calculating a tilt angle and a tilt direction of the surveying instrument main body 4 based on an attitude detection result from the attitude detector 20 and for calculating a vertical component of the tilt angle (a tilt angle of the surveying instrument main body 4 in a front-and-rear direction with respect to the object 2) and a horizontal component of the tilt angle (a tilt angle of the surveying instrument main body 4 in a left-and-right direction with respect to the object 2), a measurement program for carrying out the distance measurement, a deflection control program for controlling a deflecting operation of the optical axis deflector 18, an image processing program for carrying out the processing such as the synthesis of an image acquired by the downward image pickup module 5 and an image acquired by the measuring direction image pickup module 7 and the displacement detection of the images acquired at every predetermined time, and a calculation program for executing the various types of calculations and other programs. Further, in the storage module 17, the various types of data such as the distance measurement data, the angle measurement data, and the image data are stored.

According to an operating state of the surveying instrument main body 4, the arithmetic control module 16 develops and executes the various types of programs, carries out a control of the distance measuring unit 8, the control of the optical axis deflector 18, the control of the measuring direction image pickup module 7, the control of the downward image pickup module 5 and the like, and performs the measurement by the surveying instrument main body 4. It is to be noted that, a CPU specialized for this instrument or a general-purpose CPU is used as the arithmetic control module 16.

Further, as the storage module 17, various types of storage devices are used. These storage devices include: an HDD as a magnetic storage device, an internal memory, a memory card, a USB memory as a semiconductor storage device and other storage devices are used. The storage module 17 may be attachable and detachable with respect to the casing 22. Alternatively, the storage module 17 may enable transmitting the data to an external storage device or an external data processing device via a desired communicating means.

A description will be given on the optical axis deflector 18. The optical axis deflector 18 includes a pair of optical prisms 26 and 27. The optical prisms 26 and 27 have disk shape with the same diameter, respectively, are arranged concentrically on the distance measuring optical axis 23 while crossing the distance measuring optical axis 23 at a right angle, and are arranged in parallel at a predetermined interval. By controlling the respective rotations of the optical prisms 26 and 27, the optical axis deflector 18 enables deflecting the distance measuring optical axis 23 at an arbitrary angle ranging from 0° to a maximum deflection angle with reference to the reference optical axis "O".

Further, the optical prisms 26 and 27 are continuously driven and continuously deflected while continuously irradiating the distance measuring light 24. Thereby, the distance measuring light 24 can be scanned by a two-dimensional in a predetermined pattern with the reference optical axis "O" as a center.

Figure 3:
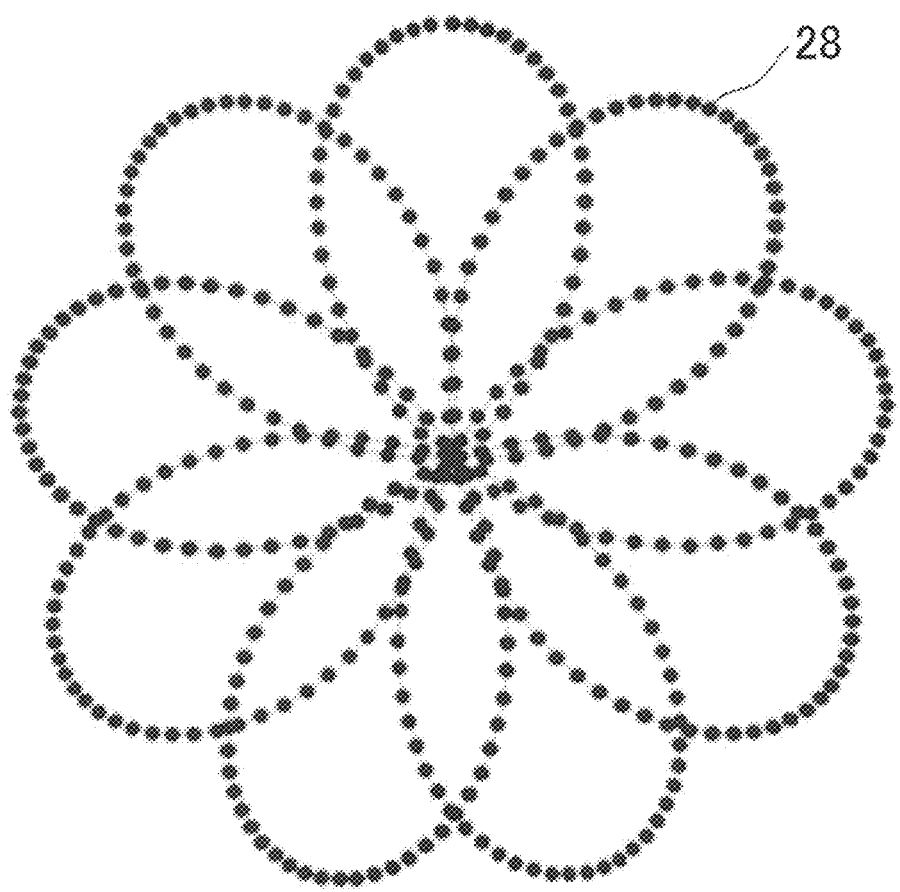
FIG. 3 is an explanatory drawing showing an instance of a two-dimensional closed loop scan pattern.

For instance, when the one optical prism of the optical prism 26 and the optical prism 27 is rotated in a forward direction at 17.5 Hz and the other optical prism is rotated in a opposite direction at 5 Hz, a flower petal-shape two-dimensional closed loop scan pattern (flower petal pattern 28 (hypotrochoid curve)) as shown in FIG. 3 is obtained.

Figure 4A:
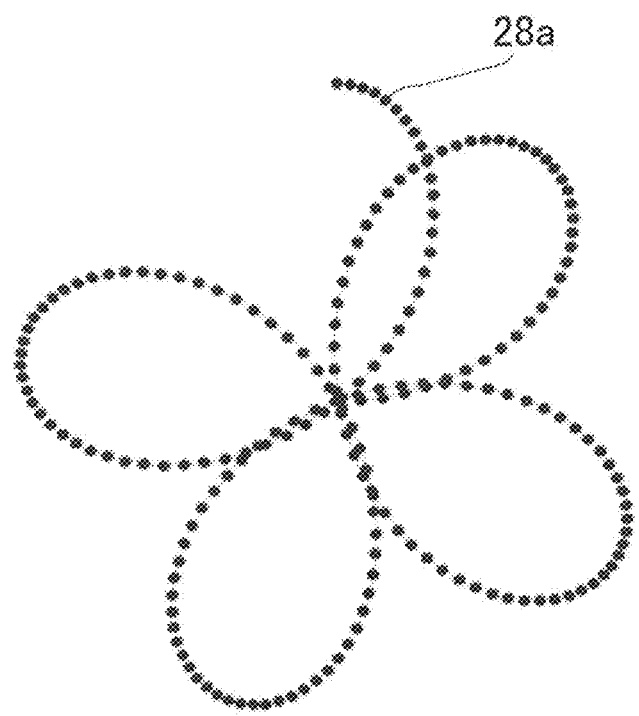
FIG. 4A is an explanatory drawing showing a scan locus acquired in a first half of a scan.
Figure 4B:
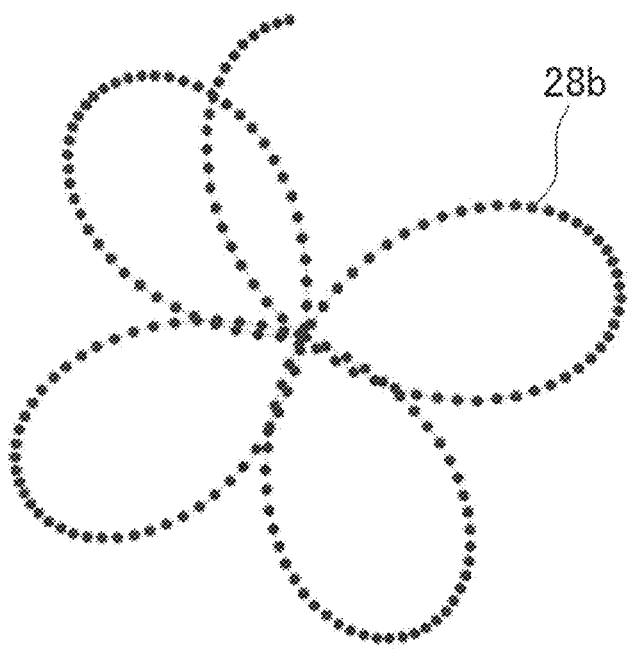
FIG. 4B is an explanatory drawing showing a scan locus acquired in a second half of the scan.

In a case where the optical prisms 26 and 27 are rotated under the above-described conditions, in a first-half (0 to 0.2 sec), a first-half locus 28a of the flower petal pattern 28 as shown in FIG. 4A is obtained. Further, in a second half (0.2 to 0.4 sec), a second-half locus 28b of the flower petal pattern 28 as shown in FIG. 4B is obtained. When the first-half locus 28a is combined with the second-half locus 28b, the flower petal pattern 28 having a cycle of 0.4 sec is formed.

Further, the flower petal pattern 28 is formed in an entire deflection range of the optical axis deflector 18. On the other hand, when the rotations of the optical prism 26 and the optical prism 27 are controlled in such a manner that a predetermine angle is maintained with respect to an optical axis (a deflected optical axis) deflected by the optical axis deflector 18, a circular scan is performed around the deflected optical axis.

It is to be noted that the local circular scan is a two-dimensional closed loop scan by which the small reciprocating rotations are performed in a part of the entire deflection range. A shape of the scan can be an arbitrary shape by the individual control of the optical prisms 26 and the optical prism 27 without being restricted to the circle.

The time detector 19 generates a reference time signal. The reference time signal may be a clock signal generated continuously from the start of measurement, or may be a timer. Further, the time detector 19 may include a GNSS receiver, and a GNSS time acquired from the GNSS receiver may be used as a reference time signal.

The reference time signal is input to the arithmetic control module 16, and the arithmetic control module 16 associates the various types of data and the detection results such as the distance measurement data, the image data, a projecting direction detection result and an attitude detection result with the reference time signal.

Next, a description will be given on the attitude detector 20. The attitude detector 20 detects a tilt angle of the casing 22 (that is, the surveying instrument main body 4) with respect to the horizontality in real time. As the attitude detector 20, for instance, a tilt sensor or an acceleration sensor is used. Alternatively, an attitude detection device disclosed in Japanese Patent Application Publication No. 2016-151423 can be also used. A detection result of the attitude detector 20 is input to the arithmetic control module 16, associated with a reference time, and stored in the storage module 17.

The outputs from the attitude detector 20 are detected by the arithmetic control module 16 at the predetermined time intervals. Therefore, a tilt change of the surveying instrument main body 4 with respect to a time can be obtained, and an average tilt angle in a predetermined time can be also calculated.

The projecting direction detecting module 21 detects a relative rotation angle of the optical prisms 26 and 27 and an integral rotation angle of the optical prisms 26 and 27, and detects a deflecting direction (a projecting direction) of the distance measuring optical axis 23 in real time.

A projecting direction detection result (an angle measurement result) is associated with a distance measurement result, and input to the arithmetic control module 16. The arithmetic control module 16 associates the distance measurement result, the projecting direction detection result and the reference time signal with each other, and stores the distance measurement result, the projecting direction detection result and the reference time signal in the storage module 17. It is to be noted that, in a case where the distance measuring light 24 is burst-emitted, the distance measurement, the angle measurement and the reference time signal are associated with each other in accordance with each intermittent distance measuring light.

The measuring direction image pickup module 7 has the first image pickup optical axis 9. As an instance, the measuring direction image pickup module 7 is a camera having an field angle at 50° to 60° substantially equal to a maximum deflection angle "θ/2" (±30°, for instance) of the optical prisms 26 and the optical prism 27. The relationship among the first image pickup optical axis 9, the distance measuring optical axis 23 and the reference optical axis "O" is already-known, and a distance between each of the optical axes has a known value.

Further, the measuring direction image pickup module 7 can acquire a still image, a continuous image or a video image in real time. The image (an observation image) acquired by the measuring direction image pickup module 7 is transmitted to the display unit 11. In the present embodiment, the image is displayed on the display unit 11 as the observation image which is a still image. The worker can observe the observation image displayed on the display unit 11 and carry out a measurement work. A center of the observation image coincides with the first image pickup optical axis 9, and the reference optical axis "O" is positioned at a position which deviates from the center of the observation image at a predetermined field angle based on a known relationship between the reference optical axis "O" and the first image pickup optical axis 9.

The arithmetic control module 16 controls an image pickup of the measuring direction image pickup module 7. In a case where the measuring direction image pickup module 7 picks up the video image or the continuous image, the arithmetic control module 16 synchronizes a timing of acquiring a frame image constituting the video image or the continuous image with a timing of scanning and of performing the distance measurement by the surveying instrument main body 4 (timing of measuring a distance per a pulsed laser beam).

As described above, the arithmetic control module 16 associates an image with the measurement data (the distance measurement data, the angle measurement data) based on a reference time. Further, the arithmetic control module 16 performs the synchronization control of the measuring direction image pickup module 7 and the downward image pickup module 5.

Since the relationship (a distance) between the first image pickup optical axis 9 of the measuring direction image pickup module 7 and the reference optical axis "O" is known, a measuring position of the distance measuring unit 8 can be associated with a position (a pixel) on the image pickup element each other. The coordinate information associated with an image signal from the image pickup element and the pixel is input to the image processing module 15 by the arithmetic control module 16.

The arithmetic control module 16 calculates a tilt angle of the surveying instrument main body 4 in a left-and-right direction and a tilt angle of the surveying instrument main body 4 in a front-and-rear direction (a direction of an approaching or separating with respect to the object 2) based on a detection result from the attitude detector 20. The tilt angle in the front-and-rear direction appears as a tilt angle of the reference optical axis "O" with respect to the horizontal, and the tilt angle in the left-and-right direction appears as a tilt (a rotation) of an image acquired by the measuring direction image pickup module 7.

A description will be given on the downward image pickup module 5.

The downward image pickup module 5 is electrically connected to the surveying instrument main body 4, and image data acquired by the downward image pickup module 5 is inputted into the surveying instrument main body 4.

An image pickup of the downward image pickup module 5 is synchronously controlling with the image pickup of the measuring direction image pickup module 7 and the distance measurement of the distance measuring unit 8 by the arithmetic control module 16. The downward image pickup module 5 is provided at an already-known position with respect to the machine center of the surveying instrument main body 4, and a distance between the downward image pickup module 5 and the lower end of the monopod 3 is also already-known.

Further, regarding the second image pickup optical axis 13 of the downward image pickup module 5, there is a known relationship in an angle between the second image pickup optical axis 13 and the reference optical axis "O" and in a position of an intersection between the reference optical axis "O" and the second image pickup optical axis 13. The arithmetic control module 16 associates the image data acquired by the downward image pickup module 5, an image acquired by the measuring direction image pickup module 7 and the distance measurement data acquired from the measurement of the distance measuring unit 8 with the reference time signal, and stores the image data, the image and the distance measurement data in the storage module 17.

The display unit 11 displays a measurement state of the surveying instrument main body 4, a measurement result and the like, and also displays the images acquired by the downward image pickup module 5 and the measuring direction image pickup module 7, a scan locus and the like. Further, the various types of commands such as an instruction concerning the measurement work can be input from the display unit 11 to the surveying instrument main body 4.

Figure 6:
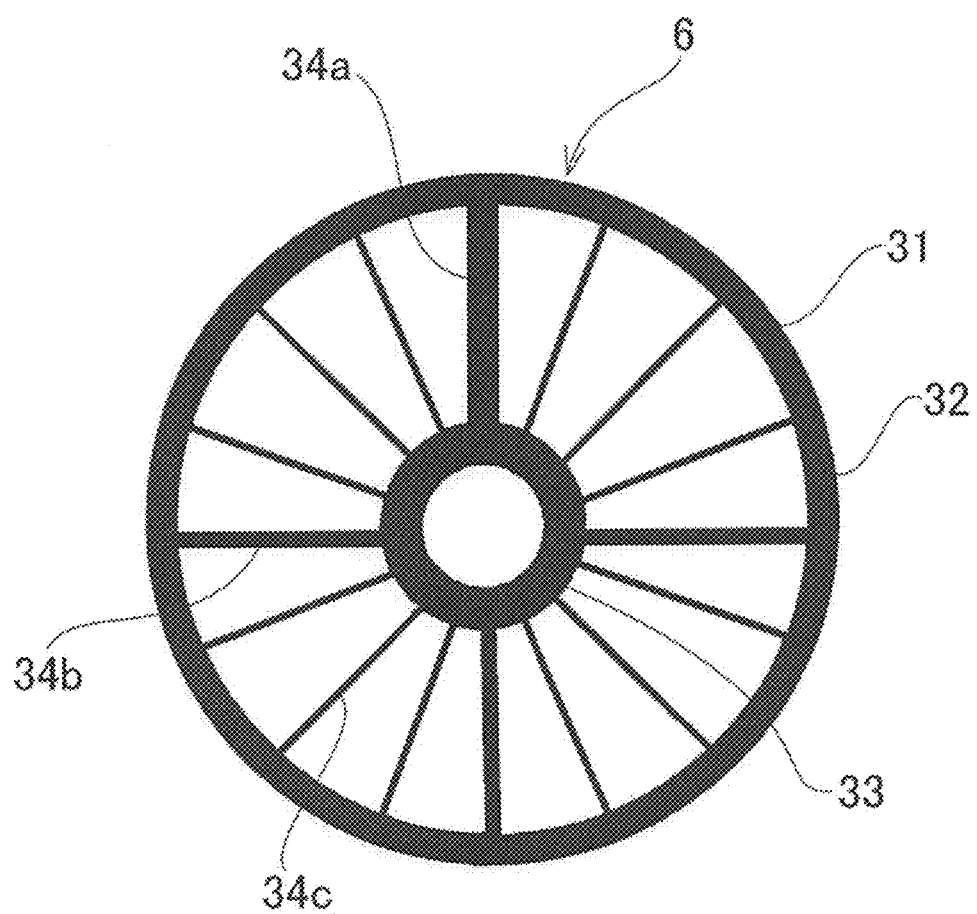
FIG. 6 is an explanatory drawing showing an installation reference plate.

Next, a description will now be given on the installation reference plate 6 in brief by reference to FIG. 6.

A shape of the installation reference plate 6 may be a discoid or rectangular plate, or the installation reference plate 6 may be any other shape. On an upper surface of the installation reference plate 6, a reference marker 31 is formed.

The reference marker 31 has a shape indicating the center and a direction which is the horizontal direction. The reference marker 31 is constituted of an outer circle line 32 which is concentric with the center of the reference marker 31 and is a perfect circle having a known diameter, an inner circle line 33 which is concentric with the outer circle line 32 and is a perfect circle having a known diameter, and the radial lines which radially extend from the center of the reference marker 31 and are formed between the outer circle line 32 and the inner circle line 33. The radial lines are formed at the positions provided by equally dividing the circumference. For instance, the radial lines are provided at the positions obtained by equally dividing the circumference by 16 (the intervals of 22.5°). One of the radial lines is a direction reference line 34a. The radial lines at the positions obtained by equally dividing the circumference by four with reference to the direction reference line 34a are the sub-direction reference lines 34b. And the remaining radial lines are the direction auxiliary lines 34c. Further, the direction reference line 34a is represented by a bold line, the sub-direction reference lines 34b are represented by the thick lines, and the direction auxiliary lines 34c are represented by the thin lines so that the direction reference line 34a, the sub-direction reference lines 34b and the direction auxiliary lies 34c can be identified.

It is to be noted that, as an identification method, in a case where an image acquired by the downward image pickup module 5 has the colors, the direction reference line 34a, the sub-direction reference lines 34b and the direction auxiliary lines 34c may be color-coded. Further, in a case where the downward image pickup module 5 identifies the 34a, 34b and 35c by the shapes, an isosceles triangle whose direction reference is a narrow angle may be used in place of the direction lines (34a, 34b, 34c).

The installation reference plate 6 is installed in such a manner that the center of the installation reference plate 6 coincides with the reference point "R". Therefore, the installation reference plate 6 is a transparent plate or the inside of the inner circle line 33 is hollowed so that the center of the installation reference plate 6 can be easily matched with the reference point "R".

Figure 7:
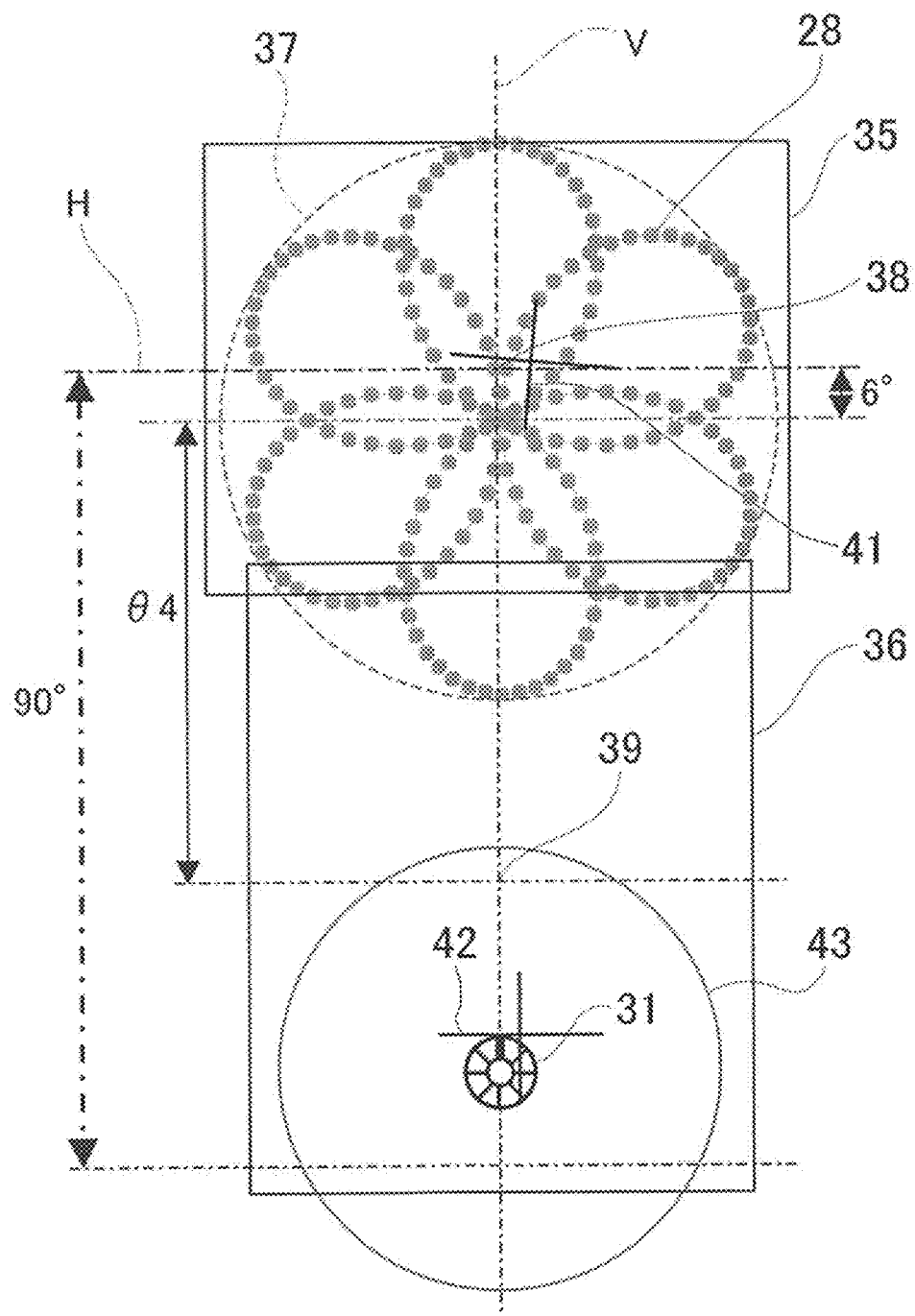
FIG. 7 is an explanatory drawing showing a relationship between the images acquired by a measuring direction image pickup module and a downward image pickup module and a scan locus acquired by the surveying instrument main body.

FIG. 7 shows a relationship between an image acquisition range of the measuring direction image pickup module 7, an image acquisition range of the downward image pickup module 5, and a rage of the scan.

In FIG. 7, a reference numeral 35 denotes a first image acquisition range of the measuring direction image pickup module 7, a reference numeral 36 denotes a second image acquisition range of the downward image pickup module 5, a reference numeral 37 denotes a deflection range of the distance measuring optical axis 23 provided by the optical axis deflector 18, and a reference numeral 28 denotes a locus in a case where a scan is performed in a flower petal pattern by the optical axis deflector 18 while carrying out the irradiation of the distance measuring light 24 more than once. The dots shown in the flower petal pattern 28 represent the irradiation points of the distance measuring light 24 formed by irradiation more than once. That is, the irradiation points represent the measuring points on a locus of the flower petal pattern 28. Further, a reference numeral 38 denotes an image center of the first image acquisition range 35 (the image center 38 coincides with the first image pickup optical axis 9), and a reference numeral 39 denotes an image center of the second image acquisition range 36 (the image center 39 coincides with the second image pickup optical axis 13).

Further, in the first image acquisition range 35, a crisscross reference target 41 indicating the horizontality and the verticality is shown. In a case where the surveying instrument main body 4 is horizontal, the image center 38 coincides with an intersection of the reference target 41. In the second image acquisition range 36, a crisscross lower target 42 indicating a vertical lower position of the machine center of the surveying instrument main body 4 is shown. It is to be noted that an intersection of the cross of the lower target 42 is the vertical lower position.

Further, in FIG. 1, a reference numeral θ1 denotes a field angle of the measuring direction image pickup module 7, a reference numeral θ2 denotes a field angle of the downward image pickup module 5, and reference numeral θ3 denotes a scan range of the surveying instrument main body 4.

Further, in FIG. 7, an angle between the first image pickup optical axis 9 and the second image pickup optical axis 13 is set to 60°, for instance, and the reference optical axis "O" tilts downward at 6°, for instance, with respect to the first image pickup optical axis 9. That is, θ4 becomes 54°.

The second image pickup optical axis 13 is directed downward, and a direction of the downward image pickup module 5 is set in such a manner that the second image acquisition range 36 includes the reference marker 31. Therefore, an image acquired by the downward image pickup module 5 includes the reference point "R", and an image of a range on a measurement worker's side (approximately 80° in the drawing) is also included.

An image having a predetermined radius with the reference point "R" as a center is set as a rotation detection image 43 for detecting the rotation angle, and the images are acquired at the predetermined time intervals. When the arithmetic control module 16 calculates a rotation displacement of the rotation detection images 43 before and after the rotation, a rotation angle of the measuring instrument main body 4 is acquired. It is to be noted that the reference target 41 and the lower target 42 are averaged the outputs from the attitude detector 20 by the arithmetic control module 16 at every predetermined time, and are calculated based on the averaged tilt.

Next, a description will be given on a measuring operation of the surveying instrument 1 by referring to FIG. 1 to FIG. 7. The following measuring operation is performed by the arithmetic control module 16 which executes the programs stored in the storage module 17.

In a case where the measurement is performed, the center of the installation reference plate 6 is first positioned on the reference point "R", and the direction reference line 34a is directed to a predetermined or arbitrary direction.

In a state where the measuring direction image pickup module 7 and the downward image pickup module 5 are operated and a first image and a second image are displayed in the display unit 11, the hand pole 3 is substantially vertically set, and a worker holds the hand pole 3. The worker observes the images displayed in the display unit 11, and confirms that the installation reference plate 6 is included in the second image. In this state, the worker captures the object 2, for instance, at the center of the first image, and performs the distance measurement via the display unit 11.

By using the optical axis deflector 18, the distance measuring optical axis 23 is directed so that it becomes parallel with the first image pickup optical axis 9, and the distance measurement is performed. Further, an image acquired by downward image pickup module 5 at the timing of acquiring the distance measurement value acquisition, and a slope distance of the downward image pickup module 5 (that is, the surveying instrument main body 4) with respect to the reference point "R", and tilt angle and a tilt direction of the downward image pickup module 5 with respect to the upper surface of the installation reference plate 6 are calculated by the image processing based on the reference marker 31.

In a case where the second image pickup optical axis 13 of the downward image pickup module 5 has tilted, an image acquired by the downward image pickup module 5 becomes an elliptic shape. Since a major axis of the ellipse is equal to a diameter of the original circle, for instance, by obtaining a diameter of an image of the outer circle line 32 enables obtaining a diameter of the outer circle line 32 in the second image. Further, when a relationship between a size of the outer circle line 32 in the second image and a distance between the reference marker 31 and the downward image pickup module 5 is obtained in advance, a slope distance between the reference marker 31 and the downward image pickup module 5 can be calculated.

Further, by obtaining a ratio of a major axis and a minor axis of the outer circle line 32, the arithmetic control module 16 enables calculating a tilt angle of the second image pickup optical axis 13 with respect to the upper surface of the installation reference plate 6. Further, by obtaining a position on the reference marker 31 at which the major axis or the minor axis of the outer circle line 32 appears, a direction along which the second image pickup optical axis 13 tilts with respect to the object 2 can be calculated.

The above description has been given on the case where the reference marker 31 is the perfect circle. On the other hand, even if the reference marker is not the perfect circle, a reference marker having a known shape can be used.

Obtaining a change of a shape (an image) of a reference marker in a case where the reference marker has tilted with respect to the shape (an image) of the reference marker when the downward image pickup module 5 faces the reference marker, the arithmetic control module 16 enables calculating a tilt angle and a tilt direction of the hand pole 3. It is to be noted that the reference marker to be used is preferably laterally and vertically symmetrical.

When the object 2 is measured by the surveying instrument main body 4, a distance to the object 2 is measured, and a deflection angle of the reference optical axis "O" (6° in FIG. 7) with respect to the first image pickup optical axis 9 and a deflection angle of the distance measuring optical axis 23 with respect to the reference optical axis "O" are detected by the projecting direction detecting module 21. Further, a tilt angle of the surveying instrument main body 4 with respect to the horizontality is detected based on a figure of the reference marker 31 or based on a detection result of the attitude detector 20, and a tilt angle of the distance measuring optical axis 23 with respect to the horizontality is calculated by the arithmetic control module 16. Further, a rotation change of the surveying instrument main body 4 is detected based on the rotation detection image 43.

Based on the tilt angle of the measuring distance optical axis 23 with respect to the horizontality, the arithmetic control module 16 corrects the slope distance to a horizontal distance, calculates a tilt angle of the distance measuring optical axis 23 with respect to the horizontality, calculates a direction angle based on a detected rotation angle, calculates a slope distance between the reference point "R" and the surveying instrument main body 4, calculates an inclination angle of the second image pickup optical axis 13, and obtains the three-dimensional coordinates of the object 2 with reference to the reference point "R".

The above description has been given on a case where the distance measuring optical axis 23 is directed along the first image pickup optical axis 9 and the measurement is performed. On the other hand, the surveying instrument main body 4 can be used as a laser scanner and the measurement is performed. In a case where the surveying instrument main body 4 is used as the laser scanner, the rotations of the optical prisms 26 and 27 are controlled, the irradiation of the pulsed distance measuring light is performed in a scan process while performing the scan with a locus of the flower petal pattern 28. Thereby, it is possible to acquire the three-dimensional distance measurement data of the respective irradiation points (the respective measuring points) taken along the locus of the flower petal pattern 28. Further, in parallel with the scan, a first image acquired by the measuring direction image pickup module 7 and a second image acquired by the downward image pickup module 5 are acquired at the predetermined intervals.

When a frame rate to acquire the first image and the second image is 10 frames/sec and a light emission rate is 10 KHz (10,000 times/sec), the distance measuring unit 8, the measuring direction image pickup module 7, and the downward image pickup module 5 are synchronously controlled by the arithmetic control module 16 in such a manner that pulsed distance measuring lights are emitted 1,000 times every time when a frame image is acquired. Further, an acquisition time of the frame image and a time of the distance measurement using the pulsed distance measuring light are associated with the reference time, respectively. It is to be noted that, when the image pickup element for each of the first image and the second image is a CMOS, a global shutter type is preferred.

It is to be noted that, if the acquisition time of the frame image and the time of the distance measurement using the pulsed distance measuring light have been accurately associated with the reference time, the synchronization of the scan and the acquisition of the first image and the second image does not have to be strict.

Further, in case of synthesizing the first image and the second image, the synthesis can be performed with the use of an overlap portion of both the images. Alternatively, as shown in FIG. 7, a scan can be performed in such a manner that a part of the flower petal pattern 28 is included in the second image acquisition range 36, and the first image and the second image can be immediately synthesized by using the distance measurement data along the locus in the first image and the distance measurement data along the locus in the second image.

By synthesizing the first image and the second image, an observation image with an extensive range including from the reference point "R" to the object 2 can be acquired.

Thereby, a confirmation of the measurement range and the measuring position can be facilitated, and the workability can be improved. Further, when the first image or a synthesized image is associated with the data along the locus obtained by the two-dimensional scan, an image with the three-dimensional data can be acquired.

Here, the surveying instrument main body 4 is manually held by a worker via the hand pole 3. Therefore, the surveying instrument main body 4 is not stably supported and slightly shakes. On the other hand, the slight shake of the surveying instrument main body 4 is mainly the hand movement, and it is considered that a large displacement does not occur within a plane orthogonal with respect to the distance measuring optical axis 23 or in parallel with a direction of the distance measuring optical axis 23 during the measurement.

Figure 5:
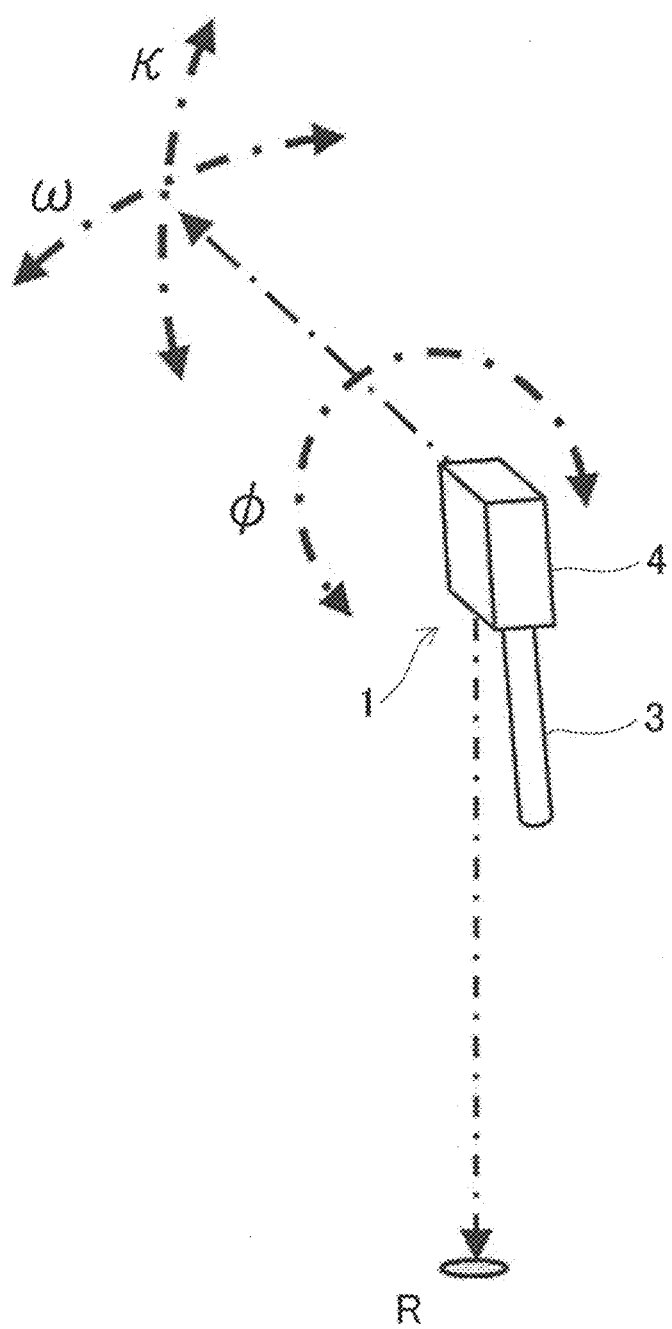
FIG. 5 is an explanatory drawing showing a displacement direction of the surveying instrument main body.

Therefore, in FIG. 5, a displacement of the surveying instrument main body 4 with respect to the time can be basically considered to be a rotation ($\phi$) within a plane orthogonal with respect to the distance measuring optical axis 23, a rotation ($\kappa$) within a vertical plane including the distance measuring optical axis 23, and a rotation ($\omega$) within a horizontal plane including the distance measuring optical axis 23 as shown.

Figure 8A:
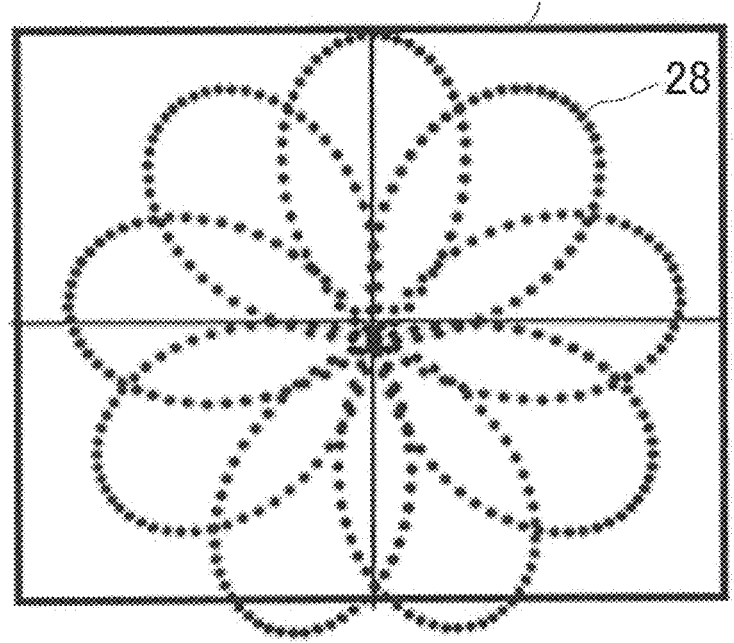
FIG. 8A is an explanatory drawing showing in a case where the surveying instrument main body has not been displaced during a scan.

In a state where the scan is performed with the use of the distance measuring light 24 and the measurement is carried out, in a case where the surveying instrument main body 4 is not displaced, an image 44 acquired by the measuring direction image pickup module 7 is not also displaced as shown in FIG. 8A. Therefore, the clear flower petal pattern 28 having the image center 38 as a center is formed.

On the other hand, in a case where the support of the surveying instrument main body 4 is unstable and the surveying instrument main body 4 has rotated (the angle: $\kappa$, $\omega$, $\phi$) during the scan, the first image pickup optical axis 9 of the measuring direction image pickup module 7 also integrally rotates (the angle: $\kappa$, $\omega$, $\phi$). Therefore, the image to be acquired rotates by (the angle: $\kappa$, $\omega$, $\phi$) with respect to the object 2.

A change in tilt of this rotation can be likewise obtained by the detection of the attitude detector 20. However, in general, in a case where the accelerations in a gravity direction and a lateral direction are synthesized and there is a fluctuation in the lateral direction, since it is difficult for the attitude detector 20 to detect a tilt with respect to the true verticality, the averaging is performed for at least one second, and an influence on an acceleration component is alleviated. Further, since the attitude detector 20 cannot detect the rotation in the left-and-right direction ($\omega$ in FIG. 5) and a parallel movement component, a method using the images is also used for the detection of a displacement.

It is to be noted that a relationship between the scan locus of the flower petal pattern 28 and a field angle (a field of view) of the measuring direction image pickup module 7 is fixed. Therefore, if there is a displacement (a rotation) between the acquired images (that is, if there is a displacement of an image pickup position with respect to the object 2), the scan locus also has a displacement, which is equivalent to the displacement between the acquired images with respect to the object 2.

Figure 8B:
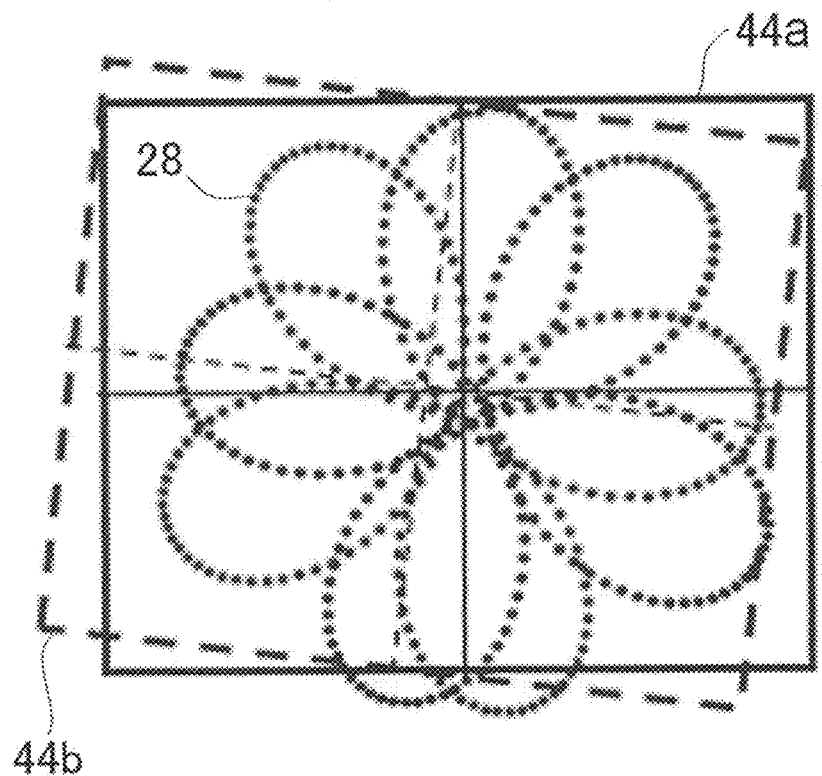
FIG. 8B is an explanatory drawing showing a in case where the surveying instrument has been displaced during the scan.

FIG. 8B shows in a case where a displacement has occurred between the acquired images. In FIG. 8B, an image 44a shown by a solid line represents a state before the displacement, and an image 44b shown by a broken line represents a state where the displacement has occurred with respect to the original image 44a.

Detecting a displacement of the image, the rotation (the angle: $\kappa$, $\omega$, $\phi$) enables acquiring in real time. As a typical method for detecting the displacement of the image, the matching based on the feature extraction, a phase restriction method or a rotation invariant phase restriction method is known. In the image, "$\kappa$" is detected as a longitudinal direction, "$\omega$" is detected as a lateral direction and "$\phi$" is detected as a rotation. Further, the rotation (the angle: $\kappa$, $\omega$, $\phi$) can be averaged at the predetermined time intervals, and an average rotation angle can be calculated.

A measuring point which is measured after the acquisition of a predetermined image and before the acquisition of a subsequent image can be obtained by a calculation.

Figure 9:
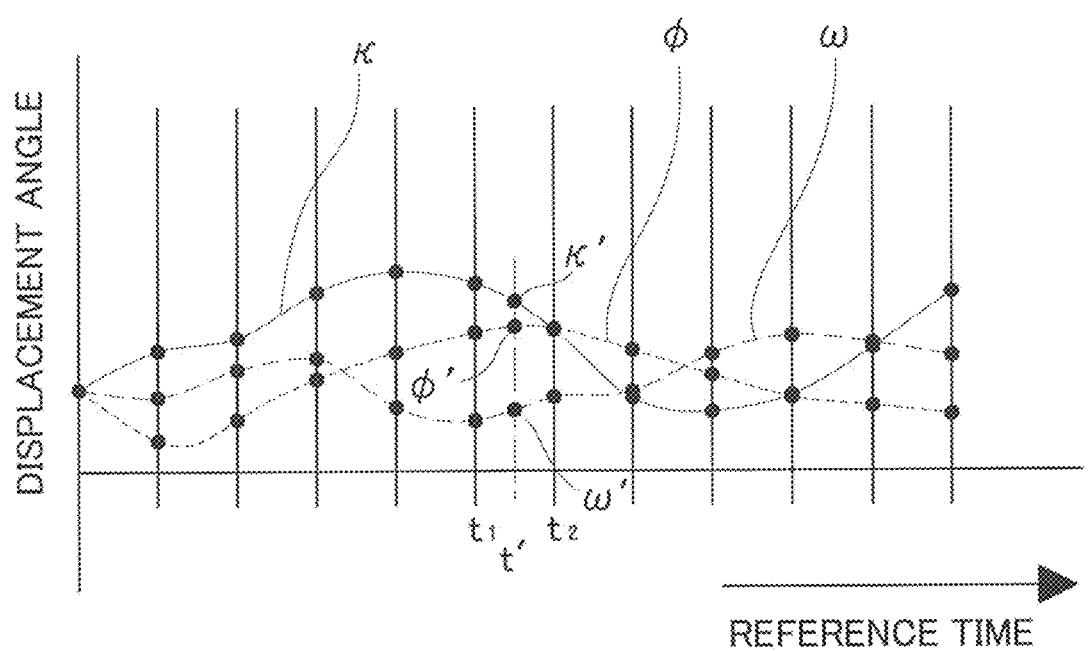
FIG. 9 is a graph showing the approximate curves based on the displacement amounts in three directions between the acquired images.

A description will be given by referring to FIG. 9. In FIG. 9, an axis of abscissa represents a reference time, and an axis of ordinate represents the displacement angles of $\kappa$, $\omega$ and $\phi$. In the drawing, a description will be given on a case where a frame rate is 10 frames/sec, and a light emission rate of pulsed distance measuring lights are 10 KHz (10,000 times/sec). It is to be noted that, needless to say, the frame rate and the light emission rate are appropriately changed depending on the performance of the instrument and a measurement environment.

An image is acquired every 0.1 second, and the distance measurement is performed 1,000 times. The acquisition of the image and the distance measurement are synchronized with each other.

By detecting the displacement of the image, the rotation angles ($\kappa$, $\omega$, $\phi$) of a subsequent image enables obtaining with respect to a previous image (that is, $\kappa$, $\omega$, and $\phi$ of the distance measuring optical axis 23). Therefore, a position of the measuring point can be calculated and corrected based on $\kappa$, $\omega$ and $\phi$.

Further, when the rotation angles ($\kappa$, $\omega$, $\phi$) are obtained every time an image is acquired, the changes of ($\kappa$, $\omega$, $\phi$) with respect to the time are obtained, and the approximate curves which include $\kappa$, $\omega$ and $\phi$ respectively can be created as shown in FIG. 9. Therefore, the rotation angles can be obtained from the approximate curves by the interpolation. For instance, as to a time t' between a time t1 and a time t2, $\kappa$', $\omega$' and $\phi$' can be obtained from the approximate curves. Based on $\kappa$', $\omega$' and $\phi$', a position of the measuring point can be identified, and an angle of elevation and a horizontal angle can be calculated.

It is to be noted that a start point is provided with reference to a tilt angle obtained by averaging the detection results of the attitude detector 20 for one second or more. The changes of ($\kappa$, $\omega$, $\phi$) between the images may be approximated by the straight lines. Further, in the above description, the distance measurement is synchronized with the image acquisition. However, $\kappa$, $\omega$, and $\phi$ at a distance measurement time can be obtained by the approximate curves based on the distance measurement time as long as the approximate curves of $\kappa$, $\omega$ and $\phi$ are obtained, and hence the distance measurement and the image acquisition do not have to be necessarily synchronized with each other.

As described above, the surveying instrument main body 4 has the time detector 19 which generates a reference time signal, and a distance measurement time acquired by the distance measuring unit 8, an image acquisition time acquired by each of the measuring direction image pickup module 7 and the downward image pickup module 5, a projecting direction detection time acquired by the projecting direction detecting module 21, and an attitude detection time acquired by the attitude detector 20 are associated with a common reference time, respectively. Therefore, with regard to the data stored in the storage module 17, by selecting the distance measurement data, the image data, the direction detection data and the like corresponding to the same reference time, the data acquired at the same time enables acquiring.

When κ, ω, and φ of all measuring points are obtained from the approximate curves by the interpolation at each distance measurement time based on all the distance measurement times, a position of each measuring point is determined by the correcting calculation. Further, the calculations of an angle of elevation and a horizontal angle and a calculation of the three-dimensional coordinates of each measuring point can be carried out by the arithmetic control module 16.

Figure 10:
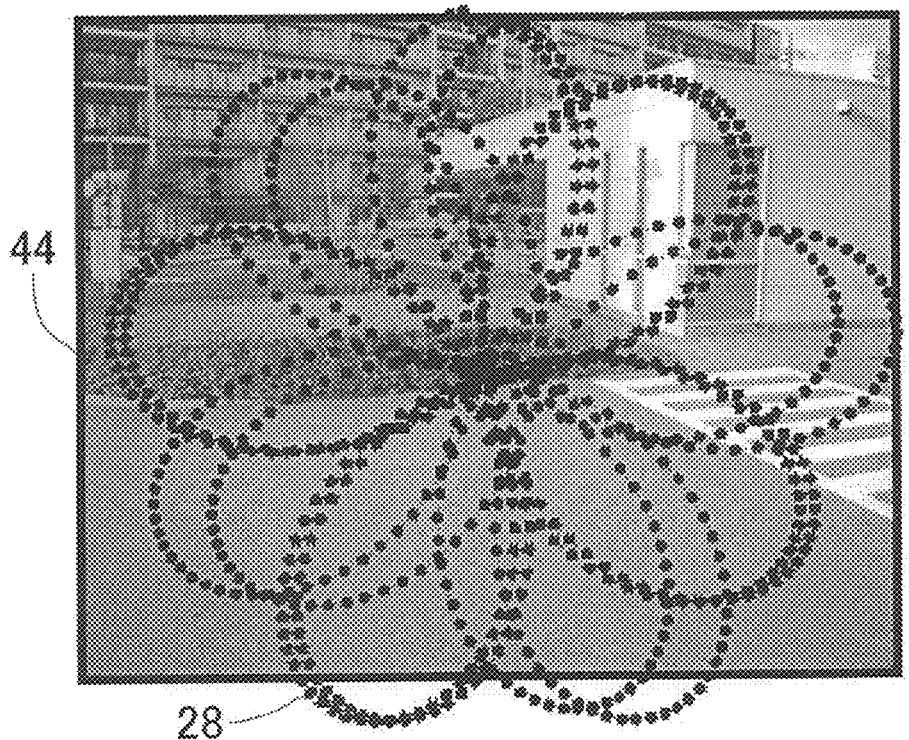
FIG. 10 is an explanatory drawing showing in a state where the loci of two flower petal patterns are aggregated in one image.
Figure 11:
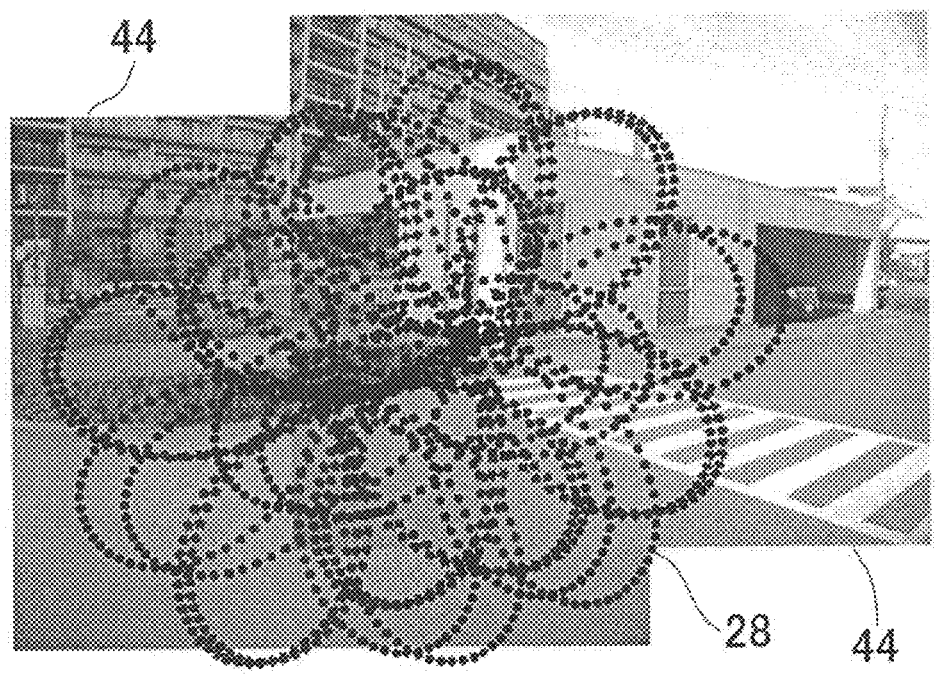
FIG. 11 is an explanatory drawing showing in a state where the loci of two flower petal patterns are aggregated in an image provided by coupling two images with each other.

Here, for instance, FIG. 10 intensively shows a determined locus by correcting the loci of two flower petal patterns 28 in one image 44. Further, FIG. 11 intensively shows a locus, which has been determined after the correction of the flower petal pattern 28, on two coupled images 44 and 44.

It is to be noted that, in case of providing no installation reference plate 6, each measuring point to be determined is a measuring point provided with reference to the intersection of the lower target 42. Further, in case of providing the installation reference plate 6, when the reference point "R" is arranged to coincide with the lower target 42 or a tilt angle and a tilt direction are calculated based on a shape of the reference marker 31, the measuring point provided with reference to the reference point "R" can be identified.

As described above, in the present embodiment, the determination of a position of each measuring point, the calculations of an angle of elevation and a horizontal angle and the calculation of the three-dimensional coordinates are performed after the measurement of each measuring point. Therefore, even if the surveying instrument main body 4 is not stably held, the measurement can be performed.

Further, in the present embodiment, based on a size and a shape of the reference marker 31 in an image acquired by the downward image pickup module 5, a position of the machine center of the surveying instrument main body 4 with respect to the reference point "R" is calculated. Therefore, since it suffices to just install the installation reference plate 6 on the reference point "R" and hold the surveying instrument main body 4 which enables the image pickup of the reference marker 31 with the use of the downward image pickup module 5 can suffice, the surveying instrument 1 can be easily installed.

Further, in the present embodiment, since the reference target 41 indicative of the horizontality is shown in the display unit 11, a worker can easily determine whether the surveying instrument main body 4 has tilted while viewing the display unit 11, and the workability can be improved.

It is to be noted that there is a case where the surveying instrument main body 4 is rotated or the surveying instrument main body 4 is largely tilted, and a measuring direction and a measuring range are changed. Alternatively, for instance, there is a case where an attitude has greatly changed due to an external factor, an image in a clear measuring direction cannot be acquired, and the acquisition of κ, ω, and φ becomes difficult. In this case, based on a detection result of the attitude detector 20 and a detection result of the rotation detection image 43, the arithmetic control module 16 judges a precipitous change in attitude of the surveying instrument main body 4, cancels the measurement, and restarts the measurement when the precipitous change in attitude no longer appears.

The presence and absence of the precipitous change in attitude may be judged with the use of the threshold values for a change rate of a detection result of the attitude detector 20 and a change rate of a detection result of the rotation detection image 43.

Figure 12:
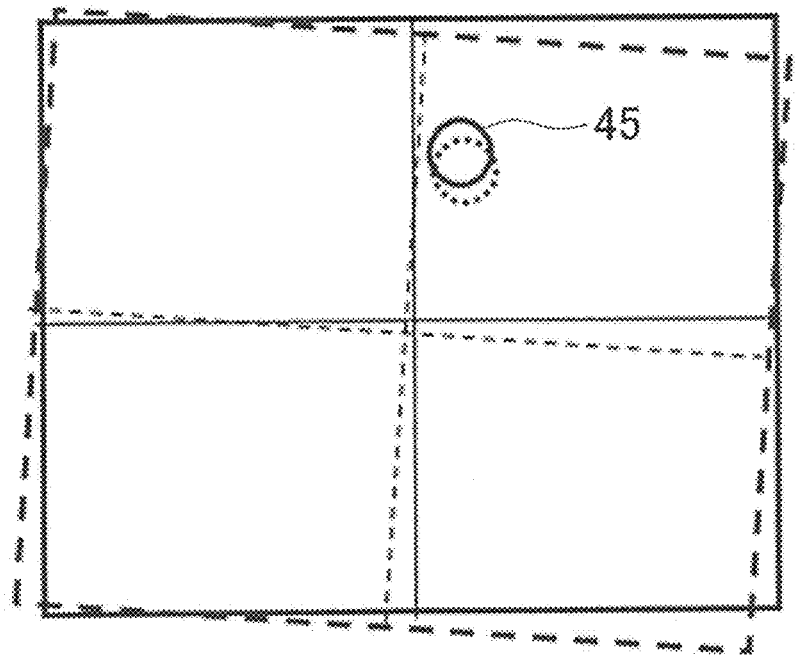
FIG. 12 is an explanatory drawing showing in a case where the surveying instrument has been displaced during a scan using a local circular pattern.

It is to be noted that, in the present embodiment, to perform the processing for determining a scan locus based on the image displacement detection, the flower petal pattern 28 is used, but any other scan pattern may be used as long as it is a two-dimensional closed loop scan pattern. For instance, an arbitrary scan pattern like a such a local circular pattern 45 as shown in FIG. 12 can be selected.

Figure 13:
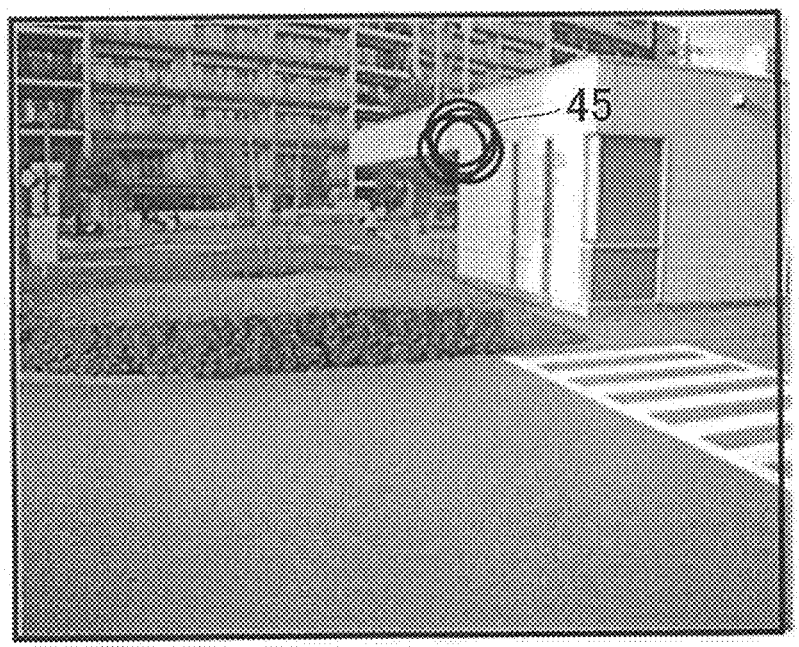
FIG. 13 is an explanatory drawing showing in a state where a plurality of local circular patterns are aggregated in one image.
Figure 14:
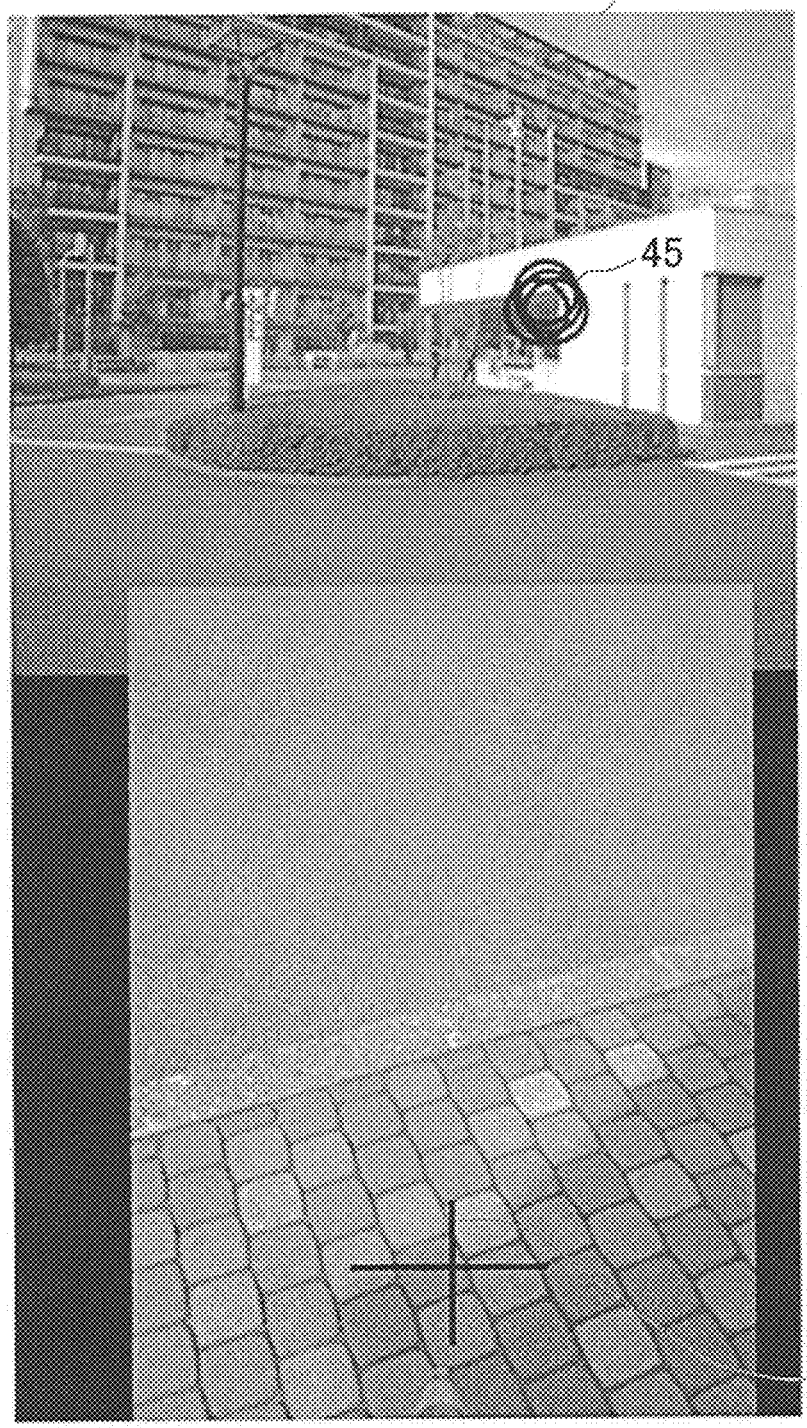
FIG. 14 is an explanatory drawing showing a coupled image provided by coupling a first image with a second image.

It is to be noted that, FIG. 13 shows a state where the loci determined after correcting a plurality of local circular patterns 45 are intensively shown on one image. Further, FIG. 14 shows a coupled image 46 coupling a first image acquired by the measuring direction image pickup module 7 with a second image acquired by the downward image pickup module 5, and a relationship between a vertical lower side of the surveying instrument main body 4 (the lower target 42) and the loci determined after correcting the local circular patterns 45 is shown.

The invention claimed is:

1. A surveying instrument comprising: a surveying instrument main body having a reference optical axis, a hand-held hand pole on which said surveying instrument main body is provided, a downward image pickup module which acquires a second image along a second image pickup optical axis extending downward at a predetermined angle with respect to said reference optical axis, wherein said surveying instrument main body comprises a measuring direction image pickup module which acquires a first image including an object along a first image pickup optical axis having a known relationship with said reference optical axis, a distance measuring unit for irradiating a distance measuring light and measuring a distance to said object, a projecting direction detecting module for detecting a projecting direction of said distance measuring light, a time detector for generating a signal of a reference time, an attitude detector for detecting a tilt of said surveying instrument main body, a display unit and an arithmetic control module, wherein said arithmetic control module is configured to control said display unit in such a manner that a vertical lower position is shown on said second image based on a detection result of said attitude detector, acquire said first images and said second images at the predetermined time intervals, detect a change between at least either said first images or said second images, associate said change between said images and the detection results of said distance measuring unit and said projecting direction detecting module with each other based on said reference time, and determine a measuring point of said object with respect to said vertical lower image.

2. The surveying instrument according to claim 1, further comprising an installation reference plate which is installed on a reference point and has a reference marker formed into a known shape, wherein said surveying instrument main body is held in such a manner that said reference marker is included in said second image and said arithmetic control module is configured to control said display unit in such a manner that said determined measuring point determined with reference to said reference point is shown in said first image based on a deviation between said reference point and said vertical lower position in said second image.

3. The surveying instrument according to claim 2, wherein said arithmetic control module is configured to calculate a position of a machine center with respect to said reference point based on a size and a shape of said reference marker in said second image, and measure said object with reference to said reference point based on said position.

4. The surveying instrument according to claim 1, wherein said arithmetic control module is configured to average the detection results of said attitude detector at every predetermined time, and control said display unit which displays at least one of a reference target indicative of the horizontality on said first image and a lower target on said second image based on a calculated average tilt.

5. The surveying instrument according to claim 2, wherein said arithmetic control module is configured to average the detection results of said attitude detector at every predetermined time, and control said display unit which displays at least one of a reference target indicative of the horizontality on said first image and a lower target on said second image based on a calculated average tilt.

6. The surveying instrument according to claim 3, wherein said arithmetic control module is configured to average the detection results of said attitude detector at every predetermined time, and control said display unit which displays at least one of a reference target indicative of the horizontality on said first image and a lower target on said second image based on a calculated average tilt.

* * * * *